(12) United States Patent
Mizutani et al.

(10) Patent No.: US 11,106,115 B2
(45) Date of Patent: Aug. 31, 2021

(54) CAMERA APPARATUS

(71) Applicant: KABUSHIKI KAISHA TOKAI-RIKA-DENKI-SEISAKUSHO, Aichi-ken (JP)

(72) Inventors: Kenichi Mizutani, Aichi-ken (JP); Masakazu Iwatsuki, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/601,850

(22) Filed: Oct. 15, 2019

(65) Prior Publication Data
US 2020/0124942 A1    Apr. 23, 2020

(30) Foreign Application Priority Data
Oct. 19, 2018   (JP) .............................. JP2018-197600

(51) Int. Cl.
*G03B 17/02*    (2021.01)

(52) U.S. Cl.
CPC .................................. *G03B 17/02* (2013.01)

(58) Field of Classification Search
USPC ....................................................... 396/535
See application file for complete search history.

(56) References Cited

U.S. PATENT DOCUMENTS

| | | | |
|---|---|---|---|
| 2004/0169771 A1* | 9/2004 | Washington | H04N 5/2251 348/374 |
| 2006/0171704 A1* | 8/2006 | Bingle | H04N 5/2254 396/419 |
| 2014/0060582 A1* | 3/2014 | Hartranft | B60S 1/528 134/18 |
| 2015/0327398 A1* | 11/2015 | Achenbach | B60R 11/04 348/148 |
| 2018/0143395 A1* | 5/2018 | Takahashi | G02B 7/025 |
| 2020/0101945 A1* | 4/2020 | Trebouet | H05K 5/0247 |
| 2020/0139934 A1* | 5/2020 | Hein | G02B 27/0006 |

FOREIGN PATENT DOCUMENTS

JP    2008-239017 A    10/2008

\* cited by examiner

*Primary Examiner* — Rodney E Fuller
(74) *Attorney, Agent, or Firm* — Roberts Calderon Safran & Cole, P.C.

(57) ABSTRACT

There is provided a camera apparatus, including: a transparent member that transmits light; a camera, at which a lens is provided, the camera performing imaging via the transparent member and the lens; a closing body that closes off a space between the transparent member and the lens; and a vent hole that vents the space.

9 Claims, 4 Drawing Sheets

CAMERA APPARATUS

CROSS-REFERENCE TO RELATED APPLICATION

This application is based on and claims priority under 35 USC 119 from Japanese Patent Application No. 2018-197600 filed on Oct. 19, 2018, the disclosure of which is incorporated by reference herein.

BACKGROUND

Technical Field

The present disclosure relates to a camera apparatus in which a camera images through a transparent member.

Related Art

In a vehicle-mounted camera recited in Japanese Patent Application Laid-Open (JP-A) No. 2008-239017, a camera is provided with a lens, the lens opposes a lens cover, and the camera images through the lens cover and the lens.

If an enclosed space is provided between the lens cover and the lens in this vehicle-mounted camera, fogging may occur in the enclosed space.

SUMMARY

In consideration of the circumstances described above, an object of the present disclosure is to provide a camera apparatus that may suppress occurrences of fogging in a space between a transparent member and a lens.

A camera apparatus according to a first aspect of the present disclosure includes: a transparent member that transmits light; a camera, at which a lens is provided, the camera performing imaging via the transparent member and the lens; a closing body that closes off a space between the transparent member and the lens; and a vent hole that vents the space.

In a camera apparatus according to a second aspect of the present disclosure, in the camera apparatus of the first aspect of the present disclosure, the vent hole vents the space toward a lower side of the camera apparatus.

In a camera apparatus according to a third aspect of the present disclosure, the camera apparatus of the first aspect or second aspect of the present disclosure further includes: a cover body that covers the camera, an interior of the cover body being in fluid communication with the space via the vent hole; and a ventilation hole that is provided in the cover body and vents the interior of the cover body.

In a camera apparatus according to a fourth aspect of the present disclosure, in the camera apparatus of the third aspect of the present disclosure, the ventilation hole vents the interior of the cover body toward the lower side of the camera apparatus.

In a camera apparatus according to a fifth aspect of the present disclosure, in the camera apparatus of the third aspect or fourth aspect of the present disclosure, the ventilation hole vents the interior of the cover body toward a vehicle interior.

In a camera apparatus according to a sixth aspect of the present disclosure, the camera apparatus of any one of the first to fifth aspects of the present disclosure further includes a cover body that covers the camera, the cover body including a first cover body and a second cover body, and the first cover body being inserted into the second cover body.

In a camera apparatus according to a seventh aspect of the present disclosure, in the camera apparatus of any one of the first to sixth aspects of the present disclosure, the vent hole is provided in the closing body.

In a camera apparatus according to an eighth aspect of the present disclosure, the camera apparatus of any one of the first to seventh aspects of the present disclosure further includes an exposure hole that exposes the lens at a side thereof at which the transparent member is disposed, the vent hole being in fluid communication with the exposure hole.

In the camera apparatus of the first aspect of the present disclosure, the lens is provided at the camera, and the camera images through the transparent member and the lens. The closing body closes off the space between the transparent member and the lens.

Because the vent hole vents the space, occurrences of fogging in the space may be suppressed.

In the camera apparatus of the second aspect of the present disclosure, because the vent hole vents the space toward the lower side of the camera apparatus, ingression of foreign substances into the space via the vent hole may be suppressed.

In the camera apparatus of the third aspect of the present disclosure, the cover body covers the camera, and the interior of the cover body is in fluid communication with the space via the vent hole.

The ventilation hole in the cover body vents the interior of the cover body. Therefore, even though the cover body covers the camera, the space may be vented toward the exterior of the cover body via the vent hole, the interior of the cover body and the ventilation hole. Thus, occurrences of fogging in the space may be suppressed effectively.

In the camera apparatus of the fourth aspect of the present disclosure, because the ventilation hole vents the interior of the cover body toward the lower side of the camera apparatus, ingression of foreign substances to the interior of the cover body via the ventilation hole may be suppressed.

In the camera apparatus of the fifth aspect of the present disclosure, because the ventilation hole vents the interior of the cover body toward the vehicle interior, ingression of foreign substances to the interior of the cover body via the ventilation hole may be suppressed effectively.

In the camera apparatus of the sixth aspect of the present disclosure, the cover body covers the camera.

Because the first cover body is inserted into the second cover body to form the cover body, ingression of foreign substances to the interior of the cover body from between the first cover body and the second cover body may be suppressed.

In the camera apparatus of the seventh aspect of the present disclosure, because the vent hole is provided in the closing body, occurrences of fogging in the space may be suppressed with a simple structure.

In the camera apparatus of the eighth aspect of the present disclosure, the exposure hole exposes the lens at a side thereof at which the transparent member is disposed, and the vent hole is in fluid communication with the exposure hole. Consequently, occurrences of fogging in the space may be suppressed excellently.

BRIEF DESCRIPTION OF THE DRAWINGS

Exemplary embodiments of the present disclosure will be described in detail based on the following figures, wherein.

DETAILED DESCRIPTION

Figure 1:
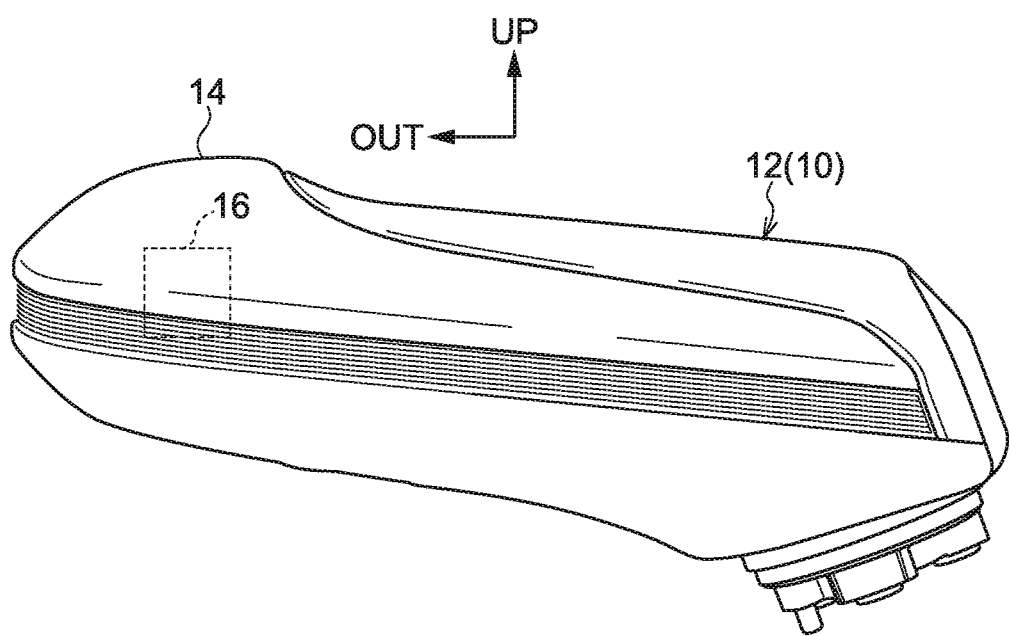
FIG. 1 is a rear view, seen from a vehicle front side, showing a camera apparatus for a vehicle according to an exemplary embodiment of the present disclosure.

FIG. 1 shows a camera apparatus for a vehicle 10, which serves as a camera apparatus according to an exemplary embodiment of the present disclosure, in a rear view seen from a vehicle front side. In the drawings, the vehicle front is indicated by arrow FR, the vehicle width direction outer side (the vehicle right) is indicated by arrow OUT, and the upper side is indicated by arrow UP.

The camera apparatus for a vehicle 10 according to the present exemplary embodiment is provided at a vehicle front side end and a vertical direction middle portion of a side door that is a door of the vehicle (specifically, a front side door). The camera apparatus for a vehicle 10 is disposed at the outer side of a vehicle body. The camera apparatus for a vehicle 10 is equipped with a base (not shown in the drawings) that serves as an installation body. The camera apparatus for a vehicle 10 is disposed at the side door by the base being fixed to the side door.

An apparatus main body 12, which is shown in FIG. 1, is supported at the upper side of the base. The apparatus main body 12 extends to the vehicle width direction outer side relative to the base. A visor 14 that serves as an accommodation body is provided at the outer periphery of the apparatus main body 12. An outer periphery face of the visor 14 constitutes a design surface of the apparatus main body 12. A circular facing hole (not shown in the drawings) is formed penetrating through a region at the vehicle rear side and the vehicle width direction outer side of the visor 14. The facing hole vents the interior of the visor 14 toward the vehicle rear side.

Figure 2:
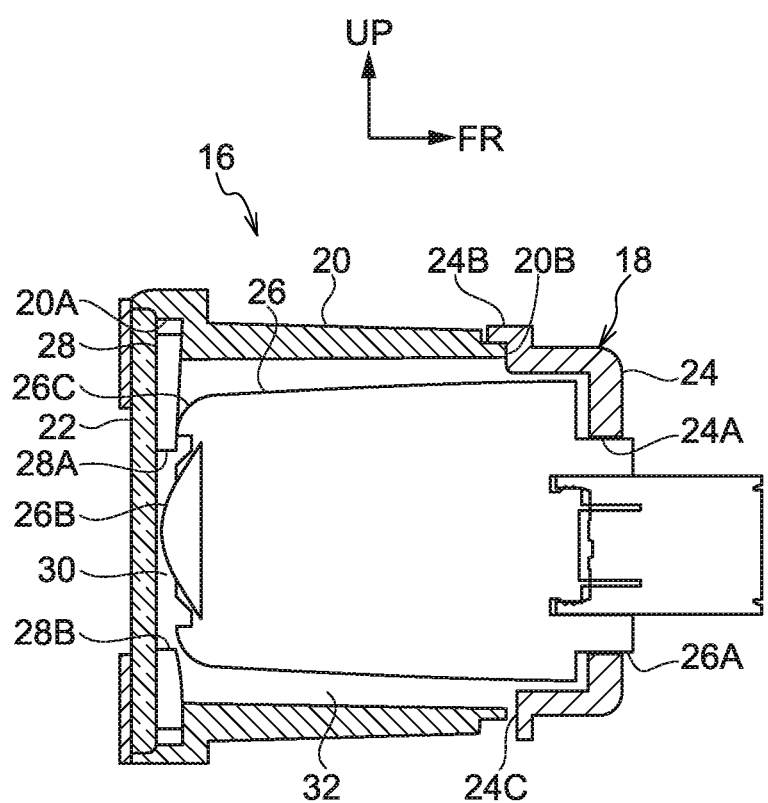
FIG. 2 is a sectional view, seen from a vehicle width direction outer side, showing a camera system of the camera apparatus for a vehicle according to the exemplary embodiment of the present disclosure.
Figure 3:
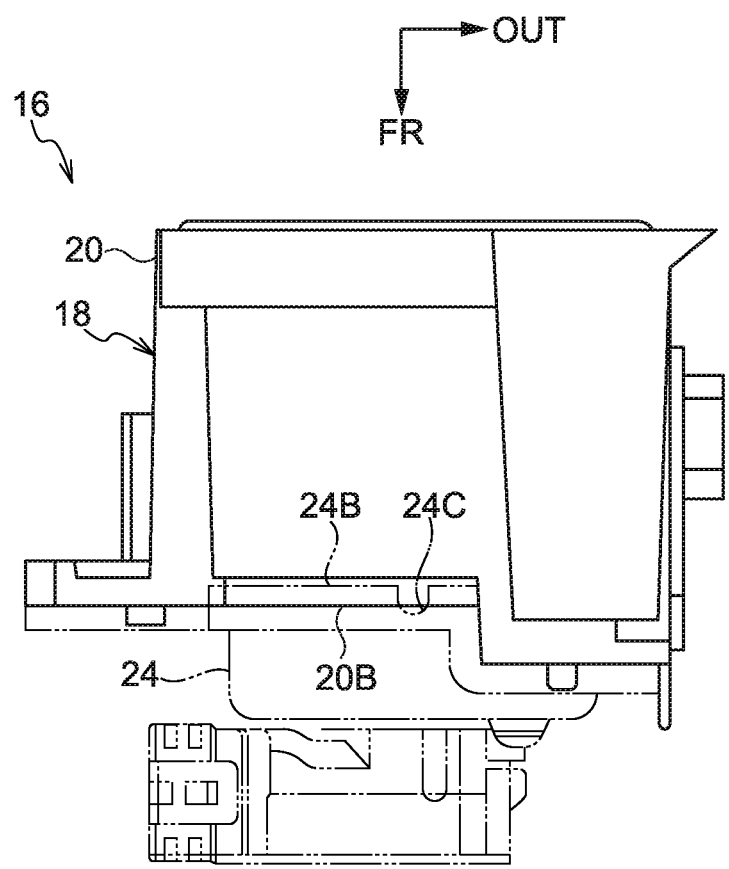
FIG. 3 is a bottom view, seen from a lower side, showing the camera system of the camera apparatus for a vehicle according to the exemplary embodiment of the present disclosure.

A camera system 16, which is shown in FIG. 2 and FIG. 3, is supported in a vehicle width direction outer side portion of the apparatus main body 12. The camera system 16 is accommodated in the visor 14, and the outer periphery of the camera system 16 is covered by the visor 14.

A bracket 18 in a substantially cuboid box shape is provided at the camera system 16. The bracket 18 serves as a cover body. The bracket 18 is fixed inside the apparatus main body 12, and the camera system 16 is supported inside the apparatus main body 12.

Figure 4:
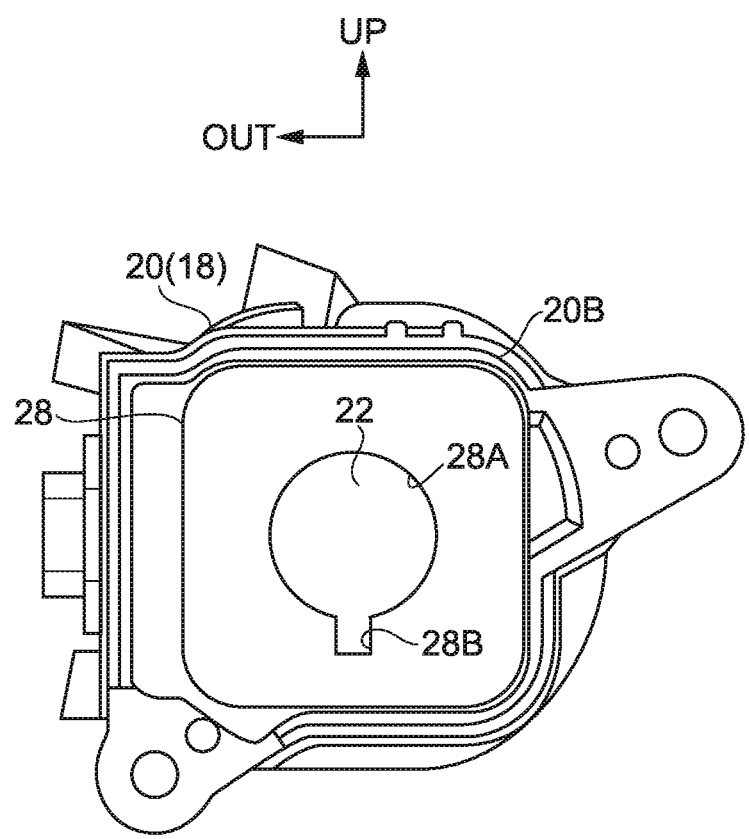
FIG. 4 is a rear view, seen from the vehicle front side, showing a first bracket and such of the camera system of the camera apparatus for a vehicle according to the exemplary embodiment of the present disclosure.

A first bracket 20 in a substantially rectangular tube shape (see FIG. 4) is provided at a vehicle rear side region of the bracket 18. The first bracket 20 serves as a first cover body. The interior of the first bracket 20 is open to the vehicle front side and the vehicle rear side. A wide chamber 20A is formed in a vehicle rear side end portion of the first bracket 20. At the wide chamber 20A, the interior of the first bracket 20 is widened in the vertical direction and the vehicle width direction. A cover glass 22 in a substantially rectangular plate shape is tightly fitted into the vehicle rear side end of the first bracket 20 (a vehicle rear side region of the wide chamber 20A). The cover glass 22 serves as a transparent member. The cover glass 22 closes off the interior of the vehicle rear side end of the first bracket 20, is transparent and is capable of transmitting light. A first projection 20B with a rectangular cross section is integrally formed along substantially the whole of an inner periphery side region of a vehicle front side end face of the first bracket 20 (in the present exemplary embodiment, substantially the whole circumference of the first bracket 20 apart from a vehicle width direction outer side portion at the lower side and an upper side portion at the vehicle width direction inner side). The first projection 20B serves as an insertion portion and protrudes to the vehicle front side.

A second bracket 24 substantially in the shape of a rectangular tube with a floor is provided at a vehicle front side region of the bracket 18. The second bracket 24 serves as a second cover body. The interior of the second bracket 24 is open to the vehicle rear side. A communication hole 24A is formed penetrating through the floor wall (a vehicle front side wall) of the second bracket 24. A second projection 24B with a rectangular cross section is integrally formed along substantially the whole of an outer periphery side portion of a vehicle rear side end face of the second bracket 24 (in the present exemplary embodiment, substantially the whole circumference of the second bracket 24 apart from a vehicle width direction outer side portion at the lower side and an upper side portion at the vehicle width direction inner side). The second projection 24B serves as an insertion-receiving portion and protrudes to the vehicle rear side. The first projection 20B of the first bracket 20 is inserted (fitted) inside the second projection 24B, and an outer periphery face of the first projection 20B is tightly fitted to an inner periphery face of the second projection 24B. A distal end face (vehicle front side end face) of the first projection 20B is abutted against the vehicle rear side end face of the second bracket 24.

A ventilation hole 24C with a substantially semicircular cross section is formed in a vehicle width direction central portion at the lower side of the vehicle rear side end face of the second bracket 24. The ventilation hole 24C extends in the vertical direction, venting toward the upper side and venting at the vehicle rear side from the vehicle rear side end face of the second bracket 24. The ventilation hole 24C penetrates through the second projection 24B of the second bracket 24 in the vertical direction, venting at the vehicle rear side from a distal end face (vehicle rear side end face) of the second projection 24B. Thus, the ventilation hole 24C vents the interior of the bracket 18 toward the lower side.

A camera 26 in a substantially circular rod shape is fixed inside the bracket 18. An outer periphery of the camera 26 is covered by the bracket 18. A pass-through portion 26A is provided at a vehicle front side end portion of the camera 26. The pass-through portion 26A protrudes to the vehicle front side. The pass-through portion 26A passes through the communication hole 24A of the second bracket 24, is tightly fitted to the communication hole 24A, and closes off the communication hole 24A.

A lens 26B is provided at a vehicle rear side end portion of the camera 26. The lens 26B is exposed at the vehicle rear side and faces the cover glass 22 of the first bracket 20. At the vehicle rear side end portion of the camera 26, a closing projection 26C with a substantially triangular cross section is provided along the whole circumference of an outer periphery side portion of the lens 26B. The closing projection 26C serves as a closing portion. The closing projection 26C protrudes to the vehicle rear side. The outer periphery region of the lens 26B of the camera 26 is sealed from the exterior of the camera 26 along the whole circumference thereof.

A double-sided tape 28 in a substantially rectangular plate shape is provided at a vehicle front side portion of the wide chamber 20A of the first bracket 20. The double-sided tape 28 serves as a closing body. A vehicle front side face of the double-sided tape 28 is adhered to the whole circumference of a vehicle front side face of the wide chamber 20A. A vehicle rear side face of the double-sided tape 28 is adhered to the whole circumference of the cover glass 22 in the first bracket 20. The double-sided tape 28 has sealing characteristics (the ability to seal against moisture and water vapor). The double-sided tape 28 seals together the vehicle front side face of the wide chamber 20A and the cover glass 22 over the whole circumference thereof.

A circular exposure hole 28A (see FIG. 4) is formed penetrating through a central portion of the double-sided tape 28. The exposure hole 28A exposes the lens 26B of the camera 26 at the vehicle rear side (the side thereof at which the cover glass 22 is disposed). A vent hole 28B with a rectangular shape (see FIG. 4) is formed penetrating through the double-sided tape 28 at the lower side of a lower end portion of the exposure hole 28A. The vent hole 28B is in fluid communication with the exposure hole 28A.

Circumferential direction positions of the vehicle front side face of the double-sided tape 28 at which the vent hole 28B is not arranged are adhered to the closing projection 26C of the camera 26. At these circumferential direction positions at which the vent hole 28B is not arranged, the closing projection 26C and the cover glass 22 are sealed together by the double-sided tape 28. Thus, an enclosed space 30 (including the exposure hole 28A) that serves as a space is formed between the lens 26B of the camera 26 and the cover glass 22. At circumferential direction positions of the vehicle front side face of the double-sided tape 28 at which the vent hole 28B is arranged, the vehicle front side face is not adhered to the closing projection 26C of the camera 26. Thus, at the circumferential direction positions at which the vent hole 28B is arranged, the lens 26B of the camera 26 and the cover glass 22 are not sealed together by the double-sided tape 28, and the enclosed space 30 is vented toward the lower side and the vehicle front side via the vent hole 28B.

Between the inner periphery of the bracket 18 and the outer periphery of the camera 26, a ventilation space 32 is formed at the vehicle front side relative to the double-sided tape 28. The ventilation space 32 is in fluid communication with the enclosed space 30 via the vent hole 28B, and is vented toward the exterior of the bracket 18 (the interior of the visor 14) via the ventilation hole 24C in the bracket 18.

The lens 26B of the camera 26 faces the facing hole in the visor 14 via the enclosed space 30 and the cover glass 22. The camera 26 is electronically connected to a control device (not shown in the drawings) of the vehicle. Subject to control from the control device, the camera 26 is capable of imaging to the vehicle rear side via the facing hole, the cover glass 22, the enclosed space 30 and the lens 26B. A monitor that serves as a display system (not shown in the drawings) is electronically connected to the control device. Subject to control from the control device, the monitor is capable of displaying images imaged by the camera 26. The monitor is disposed in a vehicle cabin and occupants of the vehicle (particularly a driver) check images displayed by the monitor. Thus, the monitor assists in viewing of the vehicle rear side by the occupants.

Now, operation of the present exemplary embodiment is described.

In the camera apparatus for a vehicle 10 with the structure described above, the enclosed space 30 between the lens 26B of the camera 26 and the cover glass 22 is closed off by outer periphery side portions of the double-sided tape 28 relative to the exposure hole 28A. The camera 26 images to the vehicle rear side via the facing hole in the visor 14, the cover glass 22, the enclosed space 30 and the lens 26B.

The vent hole 28B in the double-sided tape 28 vents the enclosed space 30. Therefore, occurrences of fogging in the enclosed space 30 may be suppressed, and the camera 26 may image the vehicle rear side via the enclosed space 30 excellently. Moreover, occurrences of fogging in the enclosed space 30 may be suppressed simply by the vent hole 28B being formed in the double-sided tape 28. Therefore, there may be no need to add, for example, a component that allows water vapor to pass through. Thus, a number of components and a number of assembly steps may be reduced, and costs may be lowered.

The exposure hole 28A of the double-sided tape 28 exposes the lens 26B of the camera 26 at a side thereof at which the cover glass 22 is disposed, and the vent hole 28B is in fluid communication with the exposure hole 28A. Therefore, occurrences of fogging in the enclosed space 30 may be suppressed excellently, and the camera 26 may image the vehicle rear side via the enclosed space 30 even more excellently.

The vent hole 28B of the double-sided tape 28 vents the enclosed space 30 toward the lower side. Therefore, ingression of foreign substances (for example, water and dust) into the enclosed space 30 through the vent hole 28B may be suppressed, and the camera 26 may image the vehicle rear side via the enclosed space 30 excellently.

The ventilation space 32 inside the bracket 18 is in fluid communication with the enclosed space 30 via the vent hole 28B, and the ventilation hole 24C of the bracket 18 vents the ventilation space 32. Therefore, even though the outer periphery of the camera 26 is covered by the bracket 18, the enclosed space 30 may be vented toward the exterior of the bracket 18 via the vent hole 28B, the ventilation space 32 and the ventilation hole 24C, and occurrences of fogging in the enclosed space 30 may be suppressed effectively.

The ventilation hole 24C of the bracket 18 vents the ventilation space 32 toward the lower side. Therefore, ingression of foreign substances into the ventilation space 32 through the ventilation hole 24C may be suppressed. Hence, ingression of foreign substances from the ventilation space 32 through the vent hole 28B into the enclosed space 30 may be suppressed effectively.

The ventilation hole 24C of the bracket 18 vents the ventilation space 32 to the interior of the visor 14 (the vehicle interior). Therefore, ingression of foreign substances into the ventilation hole 24C may be suppressed by the visor 14, and ingression of foreign substances through the ventilation hole 24C into the ventilation space 32 may be suppressed effectively.

In the bracket 18, the first projection 20B of the first bracket 20 is inserted inside the second projection 24B of the second bracket 24, the outer periphery face of the first projection 20B is tightly fitted to the inner periphery face of the second projection 24B, and the distal end face of the first projection 20B is abutted against the vehicle rear side end face of the second bracket 24. Therefore, even though the first bracket 20 and second bracket 24 are assembled in a horizontal direction (the vehicle front and rear direction in the present exemplary embodiment), ingression of foreign substances from the upper side of the bracket 18 into the ventilation space 32, between the first bracket 20 and the second bracket 24, may be suppressed and adherence of foreign substances to the camera 26 may be suppressed. Moreover, ingression of foreign substances into the ventilation space 32 may be suppressed without an increase in the number of components, and costs may be lowered.

In the present exemplary embodiment, the vent hole 28B vents the enclosed space 30 to the lower side. However, the vent hole 28B may vent the enclosed space 30 to a horizontal direction side or the upper side.

In the present exemplary embodiment, the ventilation hole 24C vents the ventilation space 32 to the lower side. However, the ventilation hole 24C may vent the ventilation space 32 to a horizontal direction side or the upper side.

In the present exemplary embodiment, the first projection 20B of the first bracket 20 is inserted into the second projection 24B of the second bracket 24 and the outer periphery face of the first projection 20B is tightly fitted to the inner periphery face of the second projection 24B. However, the second projection 24B (the insertion portion) of the second bracket 24 (the first cover body) may be inserted into the first projection 20B (the insertion-receiving portion) of the first bracket 20 (the second cover body), and an outer periphery face of the second projection 24B may be tightly fitted to an inner periphery face of the first projection 20B.

In the present exemplary embodiment, the distal end face of the first projection 20B of the first bracket 20 is abutted against the vehicle rear side end face of the second bracket 24. However, the distal end face of the first projection 20B of the first bracket 20 need not be abutted against the vehicle rear side end face of the second bracket 24.

Furthermore, in the present exemplary embodiment, the distal end face (the vehicle rear side end face) of the second projection 24B of the second bracket 24 is not abutted against a vehicle front side end face of the first bracket 20. However, the distal end face of the second projection 24B of the second bracket 24 may be abutted against the vehicle front side end face of the first bracket 20.

In the present exemplary embodiment, the first bracket 20 and second bracket 24 are assembled from horizontal direction sides. However, the first bracket 20 and second bracket 24 may be assembled from vertical direction sides.

In the present exemplary embodiment, the camera system 16 is provided at the outside of the vehicle body. However, the camera system 16 may be provided at the inside of a vehicle body (for example, in a vehicle cabin), and the camera system 16 may be provided somewhere other than a vehicle.

What is claimed is:

1. A camera apparatus, comprising:
   a transparent member that transmits light;
   a camera, at which a lens is provided, the camera performing imaging via the transparent member and the lens;
   a closing body that closes off a space between the transparent member and the lens and that is provided with a vent hole that vents the space; and
   a cover body that covers the camera, an interior space of the cover body being in fluid communication with the space via the vent hole, wherein
   the closing body is composed of a double-sided tape, the transparent member and the cover body being attached by the double-sided tape, and
   the transparent member and the camera are attached using the double-sided tape to create the space between the transparent member and the lens of the camera.

2. The camera apparatus according to claim 1, wherein the vent hole vents the space toward a lower side of the camera apparatus.

3. The camera apparatus according to claim 1, further comprising:
   a ventilation hole that is provided in the cover body and vents the interior of the cover body.

4. The camera apparatus according to claim 3, wherein the ventilation hole vents the interior of the cover body toward a lower side of the camera apparatus.

5. The camera apparatus according to claim 3, wherein the ventilation hole vents the interior of the cover body toward a vehicle interior.

6. The camera apparatus according to claim 1,
   wherein the cover body includes a first cover body and a second cover body, and the first cover body is inserted into the second cover body.

7. The camera apparatus according to claim 1, wherein the vent hole is provided in the closing body.

8. The camera apparatus according to claim 1, further comprising an exposure hole that exposes the lens at a side thereof at which the transparent member is disposed, the vent hole being in fluid communication with the exposure hole.

9. A camera apparatus, comprising:
   a transparent member that is entirely composed of a flat plate and that transmits light;
   a camera, at which a lens is provided, the camera performing imaging via the transparent member and the lens;
   a closing body that is composed of a double-sided tape and that closes off a space between the transparent member and the lens and that is provided with a vent hole that vents the space.

* * * * *